United States Patent [19]

Erath

[11] Patent Number: 5,541,894

[45] Date of Patent: Jul. 30, 1996

[54] LOW DISTORTION HYDROPHONE

[75] Inventor: Louis W. Erath, Abbeville, La.

[73] Assignee: Syntron, Inc., Houston, Tex.

[21] Appl. No.: 452,386

[22] Filed: May 26, 1995

[51] Int. Cl.⁶ .......................... H04R 17/00; H01L 41/08
[52] U.S. Cl. .......................... 367/157; 367/155; 367/163; 310/337
[58] Field of Search ...................... 367/157, 162, 367/163, 164, 167, 155, 180, 165; 310/337, 319, 342

[56] References Cited

U.S. PATENT DOCUMENTS

| | | | |
|---|---|---|---|
| 3,187,300 | 6/1965 | Brate | 310/337 |
| 3,988,620 | 10/1976 | McDavid | 367/155 |
| 4,017,824 | 4/1977 | Fife et al. | 367/155 |
| 4,174,503 | 11/1979 | Merklinger et al. | 330/300 |
| 4,464,739 | 8/1984 | Moorcroft | 367/130 |
| 4,509,037 | 4/1985 | Harris | 340/347 AD |
| 4,799,201 | 1/1989 | Nelson | 367/41 |
| 4,833,659 | 5/1989 | Geil et al. | 367/155 |
| 4,876,675 | 10/1989 | Pgura et al. | 367/155 |
| 4,977,546 | 12/1990 | Flatley et al. | 367/140 |
| 5,029,147 | 7/1991 | Andrews et al. | 367/134 |
| 5,051,799 | 9/1991 | Paul et al. | 367/25 |
| 5,193,077 | 3/1993 | Weiglein et al. | 367/23 |
| 5,335,548 | 8/1994 | Kalibjian | 73/655 |
| 5,363,344 | 11/1994 | Sofen | 367/157 |

OTHER PUBLICATIONS

Piezotronic Technical Data, Brush Electronics Company, 1952, pp. 1–27.
Material Descriptions and Typical Applications, pp. 12–13.
IEEE Standard on Piezoelectricity, Copyright 1978 by The Institute of Electrical and Electronics, Engineers, Inc., pp. 1–55.

*Primary Examiner*—Ian J. Lobo
*Attorney, Agent, or Firm*—Gunn & Associates, P.C.

[57] ABSTRACT

A system and method provide a low distortion hydrophone. A first known piezoelectric element is mounted so as to receive a pressure signal. A second piezoelectric element is provided with a means of receiving and enhancing the same pressure signal. Since a piezoelectric element is a capacitor, another capacitor is coupled in parallel with the second element to serve as a divider. The output voltage of the combination of the two elements is taken as the difference between the positive terminals of the two elements. Thus, the effect of the pressure enhancer and capacitance divider is to provide a difference in potential between the fundamentals from the two elements, while rendering the amplitude of the second harmonics equal. The two equal second harmonics cancel each other out at the output terminals, while retaining a useful fundamental for further signal processing. Further, the means of enhancing the pressure signal may comprise a cone-shaped baffle to amplify the pressure signal, or it may comprise a thinner diaphragm upon which the piezoelectric element is mounted to increase the flexing and thus the stress on the element. Also, more than two hydrophone elements may be coupled together to even more closely eliminate distortion over a wide pressure range.

18 Claims, 4 Drawing Sheets

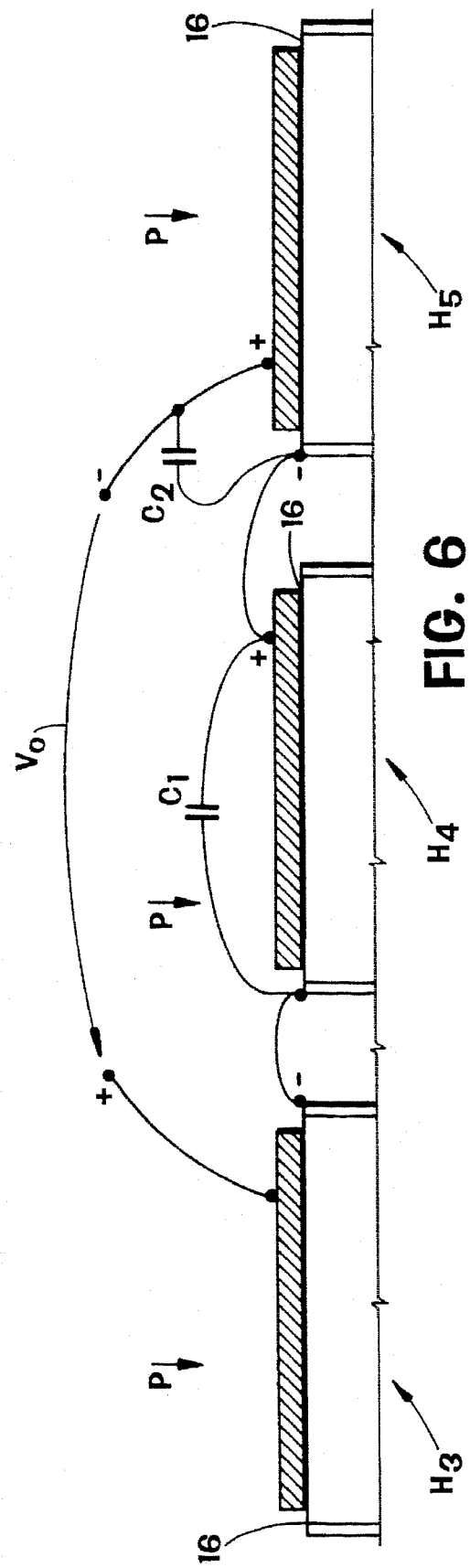
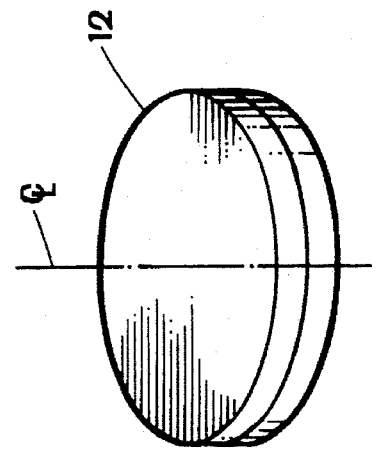
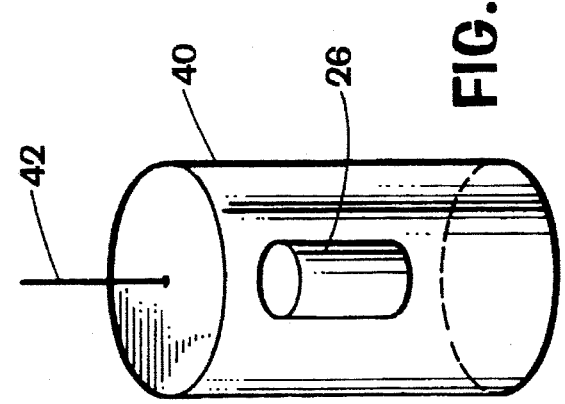

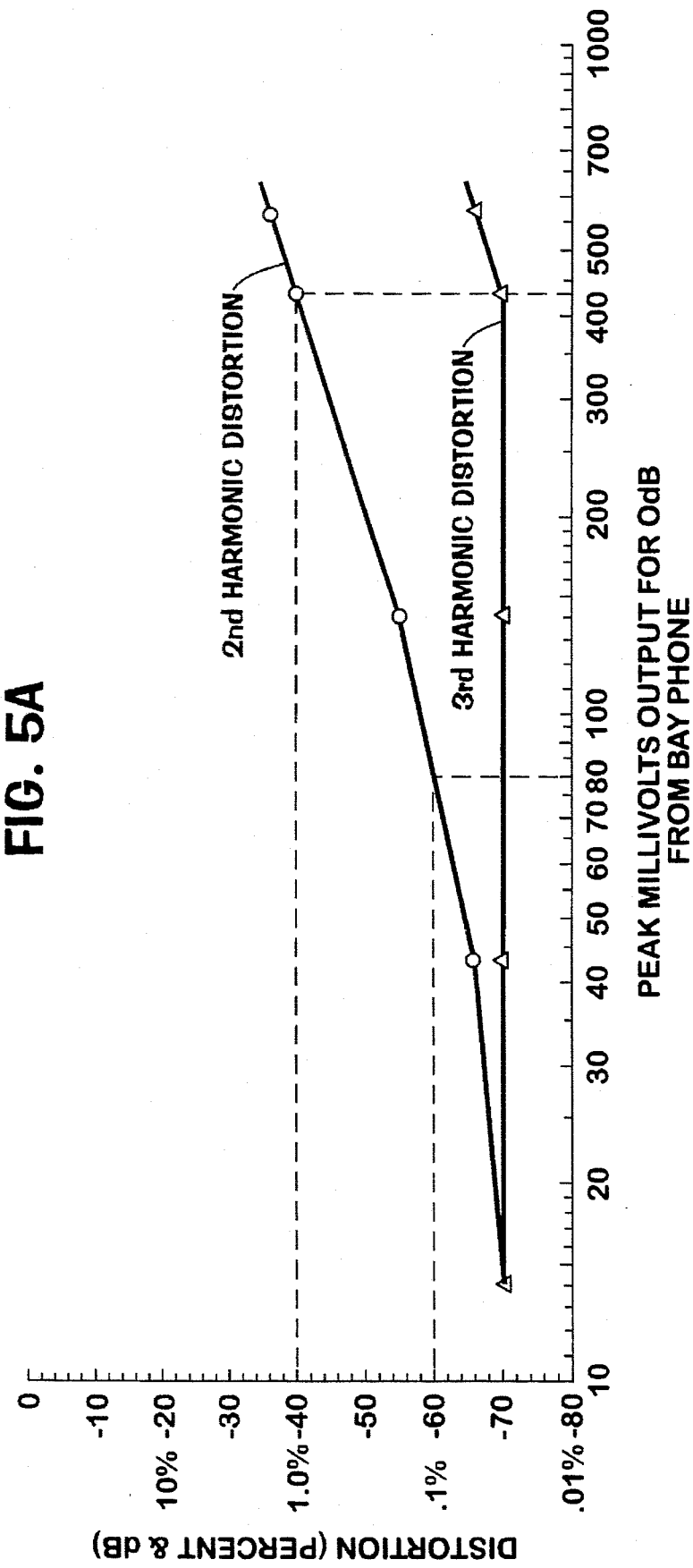

LOW DISTORTION HYDROPHONE

FIELD OF THE INVENTION present invention relates generally to the field of hydrophones and, more particularly, to a method and system for reducing the distortion from the piezoelectric elements in hydrophones.

BACKGROUND OF THE INVENTION

Piezoelectric transducers for a variety of applications, including hydrophones, are well known. Piezoelectric devices respond to an application of stress, such as externally applied pressure, to develop an electrical potential. Conversely, piezoelectric devices develop a mechanical response with a voltage is applied. The behavior and characteristics of piezoelectric materials is well described in *IEEE Standard on Piezoelectricity*, 1978, incorporated herein by reference.

The earliest such applications for transducers were entirely analog. With the advent of digital technology, however, digital techniques were soon applied to signal detection and processing. This digital technology, in general, is capable of higher resolution than the previous analog techniques.

The earliest digital signal acquisition and processing data rates were extremely slow, and had fewer bits per sample, compared with the state of the art today. With slow bit rates, distortion produced by the piezoelectric crystals was relatively insignificant. In this context, the term "distortion" refers to the increasing significance of harmonics, particularly the second harmonic, compared to the fundamental of the signal, with increasing signal output. In other words, as stress on the piezoelectric device, for example in the form of pressure, increases, the amplitudes of the harmonics produced by the crystal increase at a rate that is faster than the rate of increase in the amplitude of the fundamental. However, as digital signal processing has increased in speed and resolution, the distortion of the signal from the harmonics has become more and more important. The clarity and resolution is thus dependent more and more on the signal from the transducer being relatively undistorted.

In real seismic applications, noise from the background and other sources is of much higher amplitude than the return signal of interest. A variety of techniques, such as correlation, have been developed to extract the reflected, desired signal from this background noise. The non-linearity in the signal from the crystal will cause inter-modulation between the background noise and the desired signal. In other words, the desired signal will be amplitude modulated by the much larger noise signal, generating new families of modulation products, complicating the filtering process.

Equipment improvements in data rate, resolution, and linearity bring better definition in resultant profiles, to the point that errors and distortion from the transducer contribute most of the signal error. That means that an improvement in the accuracy of the transducer brings an immediate improvement in signal quality.

A further difficulty lies in the fact that, since there is no perfect transducer, there is no standard against which to measure the distortion from a transducer. This is illustrated in FIG. 10, page 36, in the previously mentioned *IEEE Standard on Piezoelectricity*.

Thus, there remains a need for a method and system to eliminate or at least minimize the effects of signal distortion from the active element in a transducer, such as a piezoelectric device. Such a method and system should eliminate the distortion effects of the piezoelectric device, despite the non-linearity of the element itself. The system should be self-contained and not have to rely on any other signal processing steps or other active elements such as transistors.

SUMMARY OF THE INVENTION

The present invention solves these and other problems of the prior art. A first known piezoelectric element is mounted so as to receive a pressure signal. A second piezoelectric element is provided with a means of receiving and enhancing the same pressure signal. Since a piezoelectric element is a capacitor, another capacitor is coupled in parallel with the second element to serve as a divider. The output voltage of the combination of the two elements is taken as the difference between the positive terminals of the two elements. Thus, the effect of the pressure enhancer and capacitance divider is to provide a difference in potential between the fundamentals from the two elements, while rendering the amplitude of the second harmonics equal. The two equal second harmonics cancel each other out at the output terminals, while retaining a useful fundamental for further signal processing.

In a preferred embodiment, a cone-shaped diaphragm is mechanically coupled to the pressure receiving surface of the piezoelectric element to amplify the pressure signal on the element. It is known that subjecting a piezoelectric element to greater stress increases the voltage developed by the element. Thus, other means of increasing the stress on the element are acceptable and fully within the scope of the present invention. For example, a piezoelectric element is mounted upon a flexible diaphragm which bends or flexes when the element is subjected to a pressure signal. Applying a piezoelectric element to a thinner flexible diaphragm will result in greater flexing of the diaphragm and concomitant greater stress on the piezoelectric element, thereby increasing the voltage developed.

It has been recognized that the present invention, when using two elements coupled together, precisely cancels the second harmonic at only one point, although the second harmonic is significantly reduced at all other relevant points. It has been found that coupling more than two elements together results in even more accurate elimination of the second harmonic throughout the relevant range of pressures. Thus, coupling more than two elements together tailors the invention to closely match the characteristic curve of distortion versus output voltage for a selected element.

These and other features of the present invention will immediately apparent to those of skill in the art as they review the following detailed description along with the accompanying drawing figures.

BRIEF DESCRIPTION OF THE DRAWINGS

FIG. 4 depicts a known bilaminer disc piezoelectric element that is preferably used in the present invention.

FIG. 5A is a plot of distortion versus voltage out of the transducer element (i.e., with increasing pressure (stress) on the element), illustrating experimental results.

FIG. 6 is a schematic diagram of more than two piezoelectric elements coupled together to more closely approximate the effects of the second harmonic throughout the characteristic curve.

FIG. 7 depicts the housing of FIG. 3 within a hydrophone can as the present invention is used in application.

DETAILED DESCRIPTION OF A PREFERRED EMBODIMENT Structure

Figure 1:
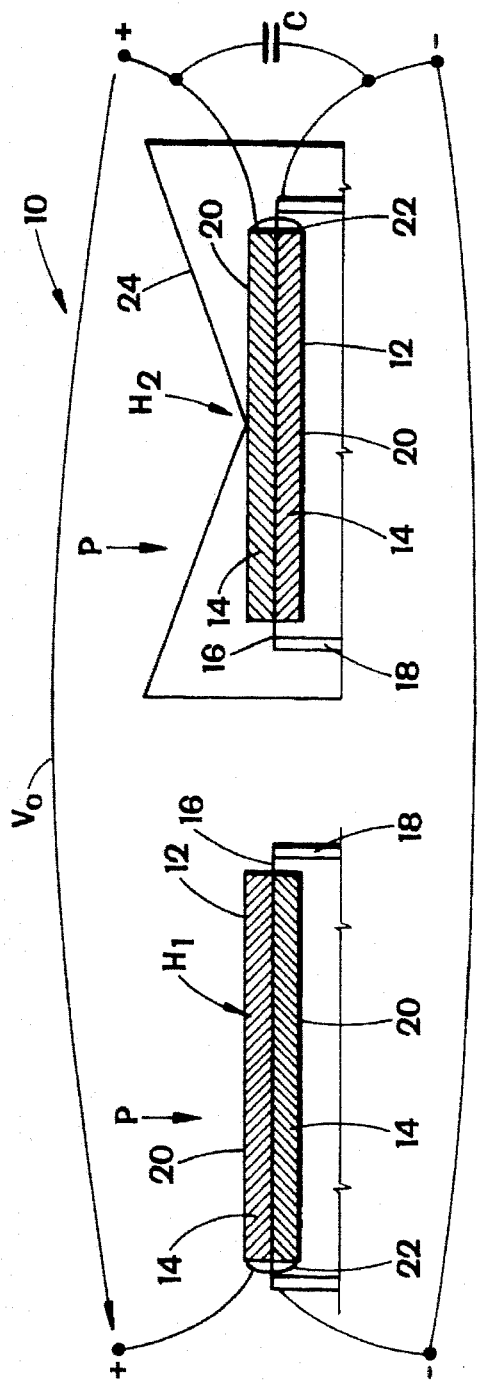
FIG. 1 is a schematic diagram of a pair of hydrophones coupled together to eliminate the effects of the second harmonic generated from each.

FIG. 1 depicts a schematic diagram of a hydrophone system 10 including a first hydrophone $H_1$ and a second hydrophone $H_2$ arranged in accordance with the present invention. Each hydrophone includes a bilaminar disc 12, as shown in FIG. 4, although other appropriate piezoelectric element arrangements may be used within the scope of the present invention.

Each bilaminar disc 12 comprises a pair of ceramic discs 14 separated by a diaphragm 16. The ceramic discs are preferably EC70 Type V, which is a modified lead zirconate titanate, as defined by DOD-STD-1376A(SH) ceramic Types I–VI. This material provides a high dielectric constant. The characteristics of this material make it ideal for hydrophones or low-power projectors requiring low "A" and high sensitivity.

The diaphragm 16 is preferably made of beryllium copper, brass or stainless steel and is supported on a stiff annular housing 18. It should be noted that FIG. 4 depicts the ceramic elements arranged with the remanent polarization is the same direction while FIG. 1 shows them in opposite directions. Either orientation is appropriately used and only affects the electrical connections described below.

As shown in FIG. 1, the upper and lower surfaces of each bilaminar disc comprise positive electrodes 20. The respective positive electrodes are connected via jumpers 22, while the diaphragm of each hydrophone comprises a negative electrode. The respective diaphragms of the hydrophones $H_1$ and $H_2$ are electrically coupled together. The output signal of the hydrophone combination 10 is taken as the difference in potential between the respective positive electrodes between the two hydrophones.

The hydrophone $H_2$ is provided with a diaphragm 24, arranged in manner similar to that shown in *Piezotronic Technical Data*, Brush Electronics Company, 1952, incorporated herein by reference, at page 9, FIG. 14(B). The diaphragm 24 serves to amplify the pressure signal that is sensed by the hydrophone $H_2$, so that for a given pressure p, the voltage generated by the hydrophone $H_2$ will be higher than the voltage generated by the hydrophone $H_1$. For convenience of illustration, in the following discussion, the diaphragm 24 is assumed to increase the harmonic distortion by 10 times.

The hydrophone $H_2$ is also provided with a capacitor C across the positive and negative electrodes, the function of which is described below with regard to the operation of the invention.

Figure 3:
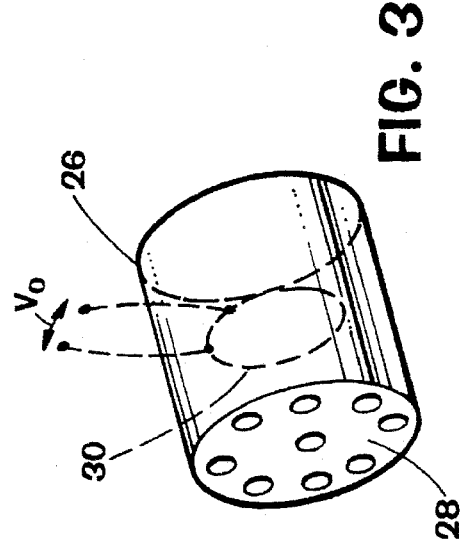
FIG. 3 depicts a housing for containing the hydrophones as depicted in FIG. 2.
Figure 2:
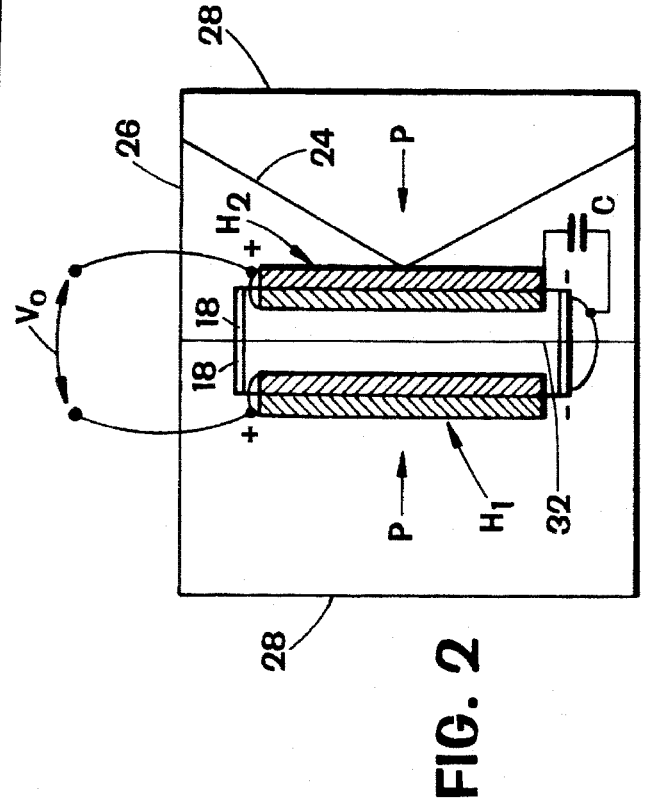
FIG. 2 is a schematic diagram of the structural arrangement of the hydrophones as arranged in a preferred embodiment.

FIGS. 2 and 3 depicts the preferred structure for the installation of the hydrophones. A canister 26 is enclosed by apertured endcaps 28. A region 30 is depicted in dashed lines to show the mounting of the hydrophones within the canister 26. The hydrophones $H_1$ and $H_2$ are mounted on either side of a divider plate 32. The electrical connections are the same in FIG. 2 as previously described with regard to FIG. 1.

Before describing the operation of the present invention in detail, it should be recognized that the canister 26 of the present invention may be carried within a hydrophone can 40, as shown in FIG. 7. The hydrophone can 40 is commonly attached to a cable 42 for ease of deployment of the hydrophone can 40 with the hydrophones and canister 26 contained therein.

Now that the structure of the present invention has been described in detail, the following description provides an explanation of the operation of the hydrophone combination.
Operation In operation, the hydrophone is submerged in a fluid, usually water or oil, at a specific depth to receive a sound signal. Since the dimensions of the canister 26 are very small compared to the wavelength of the sound signal which it will receive, the pressure signal received by the hydrophones $H_1$ and $H_2$ will be essentially the same.

As a pressure pulse strikes the hydrophone HI, it will develop an output voltage. Assume that the output voltage produces a second harmonic at −60 dB, or 0.1% of the fundamental, as shown in FIG. 5A. This results in an output voltage from the second harmonic of the hydrophone $H_1$ of about 80 millivolts. Thus, the fundamental from $H_1$ is about 80 volts.

As previously mentioned, the baffle 24 is assumed to be selected to produce a second harmonic from $H_2$ that is ten times that of the second harmonic from $H_1$. Thus, the second harmonic from $H_2$ is −40 dB or 1% of the fundamental from $H_2$. The second harmonic is thus about 420 mV from $H_2$ and the fundamental is about 42V.

The value of the capacitor C is selected to exactly counteract the values of the second harmonics from $H_1$ and $H_2$. Thus, the second harmonic from $H_2$ is to be reduced by a factor, $f$, to 80 mV.

$$f = 420 \div 80 = 5.25 \text{ (in this example)} \quad (1)$$

The fundamental from the hydrophone $H_2$ is reduced by the same factor $f$ to yield $$42 \div 5.25 = 8 \text{ millivolts} \quad (2)$$

Since the output voltage, $V_o$, from the system 10 is the difference between the total signals from the hydrophones $H_1$ and $H_2$, and the second harmonics have canceled each other out, the output, Vo, is 80−8 =72 millivolts, a useful level of output without the distortion of the second harmonic.

Figure 5B:
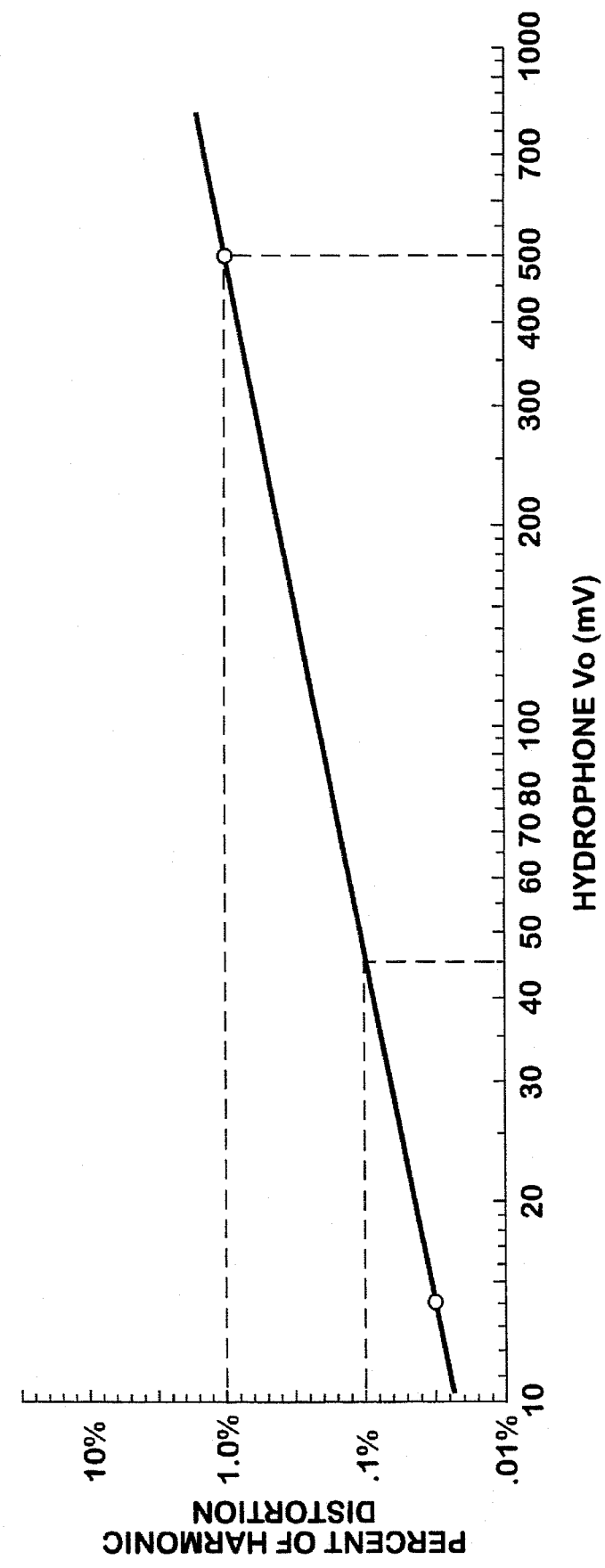
FIG. 5B is a hypothetical, idealized plot of distortion versus voltage out of the transducer element with increasing stress on the element.

FIG. 5B is provided as an additional example to show that the present invention is equally applicable to other characteristic curves for piezoelectric elements.

It is recognized that the distortion throughout the range of pressures (and thus output voltages) is non-linear and will vary either side of the example chosen. However, the present invention significantly reduces the harmonic distortion from the hydrophone system, even at points off of the point at which distortion is eliminated. Also, the value of the capacitor C can be made tunable to the value of the factor $f$ that will yield the best results from the environment in which the hydrophone array will operate.
Another Preferred Embodiment FIG. 6 depicts two additional features of the present invention. First, each piezoelectric element is mounted upon a flexible diaphragm 16. However, in this embodiment, the thickness of the diaphragm 16 is different for each element. For example, a hydrophone $H_3$ may be considered the primary source of the fundamental signal for subsequent reception and analysis. The diaphragm 16 upon which the element in hydrophone $H_3$ is mounted may be a berilium copper disc, in this case 0.020' thick. The diaphragm in hydrophone $H_4$ may be selected from the same (or different) material, but 0.015' thick, and the diaphragm in hydrophone $H_5$ may be 0.010 thick. Since each of the elements is subjected to the same pressure signal, P, the diaphragm of hydrophone $H_3$ is thickest and flexes the least, and the diaphragm of hydrophone $H_5$ is thinnest and flexes the most. Thus, of the three elements, the hydrophone $H_5$ generates the highest percentage of distortion, particularly from the second harmonic.

The other feature of the present invention shown in FIG. 6 is the provision of more than two hydrophone elements coupled together. This feature permits the tailoring of the selection of the values of a first capacitor $C_1$ and a second capacitor $C_2$ to exactly cancel distortion at two points, and more nearly eliminate all distortion at all points. It will also be appreciated by those of skill in the art that the capacitors may be made variable, and the hydrophone system adapted to a specific application, by factory testing and analysis before shipment.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A hydrophone comprising:
   a. a first hydrophone crystal having positive and negative electrodes, the first hydrophone crystal producing a fundamental voltage and at least a second harmonic voltage when subjected to pressure;
   b. a second hydrophone crystal having positive and negative electrodes, the second hydrophone crystal producing a fundamental voltage and at least a second harmonic voltage when subjected to pressure;
   c. a pressure amplification diaphragm mechanically coupled to the second hydrophone crystal;
   d. an electrical connection between the negative electrodes of the first crystal and the second hydrophone crystal;
   c. output terminals comprising the positive electrode of the first hydrophone crystal and the positive electrode of the second hydrophone crystal; and
   f. a divide comprising a capacitor between the positive and negative electrodes of the second hydrophone crystal, the capacitance of the capacitor selected to cancel out the second harmonic voltage from the first hydrophone crystal and the second harmonic voltage from the second hydrophone crystal.

2. The hydrophone of claim 1 wherein the first hydrophone crystal comprises a bilaminar disc comprising a pair of piezoelectric elements separated by a first laminate diaphragm.

3. The hydrophone of claim 1 wherein the second hydrophone crystal comprises a bilaminar disc comprising a pair of piezoelectric elements separated by a second laminate diaphragm.

4. The hydrophone of claim 2 wherein the first laminate diaphragm comprises the negative electrode of the first hydrophone crystal.

5. The hydrophone of claim 3 wherein the second laminate diaphragm comprises the negative electrode of the second hydrophone crystal.

6. The hydrophone of claim 1 further comprising a canister enclosing the first and second hydrophone crystals.

7. The hydrophone of claim 6 wherein the canister comprises a right cylinder, a first apertured end cap at a first end of the canister, and a second apertured end cap at a second end of the canister.

8. The hydrophone of claim 7 further comprising a divider plate proximate the first end cap and the second end cap.

9. The hydrophone of claim 8 wherein the divider plate defines a first side and a second side and wherein the first hydrophone crystal is mounted to the first side and the second hydrophone crystal is mounted to the second side.

10. A hydrophone system comprising:
    a. a first piezoelectric element with positive and negative output terminals;
    b. a second piezoelectric element with positive and negative output terminals, the second piezoelectric element coupled in electrical parallel with the first piezoelectric element;
    c. a stress enhancing means mechanically coupled to the second piezoelectric element; and
    d. a capacitor electrically coupled between the positive and negative output terminals of the second piezoelectric element.

11. The hydrophone of claim 10 further comprising a plate for supporting the first and second piezoelectric elements.

12. The hydrophone of claim 11 wherein the plate defines a first side and a second side and wherein the first piezoelectric element is mounted to the first side and the second piezoelectric element is mounted to the second side.

13. The hydrophone of claim 12 further comprising a canister surrounding the plate.

14. The hydrophone of claim 13 wherein the canister comprises a cylinder enclosed at either end with an apertured end cap.

15. The hydrophone system of claim 10 further comprising
    a. a first flexible diaphragm for supporting the first piezoelectric element, the first flexible diaphragm defining a first thickness;
    b. a second flexible diaphragm for supporting the second piezoelectric element, the second flexible diaphragm defining a second thickness; wherein the second thickness is less than the first thickness and the second flexible diaphragm thereby serves as the stress enhancing means.

16. A hydrophone system comprising:
    a. a first piezoelectric element with positive and negative output terminals;
    b. a second piezoelectric element with positive and negative output terminals, the second piezoelectric element electrically coupled in series with the first piezoelectric element;
    c. a third piezoelectric element with positive and negative output terminals, the third piezoelectric element electrically coupled in series with the second piezoelectric element;
    d. a first stress enhancing means mechanically coupled to the second piezoelectric element;
    e. a second stress enhancing means mechanically coupled to the third piezoelectric element;
    f. a first capacitor electrically coupled between the positive and negative output terminals of the second piezoelectric element;

g. a second capacitor electrically coupled between the positive and negative output terminals of the third piezoelectric element;

h. a first hydrophone system output terminal electrically coupled to the positive output terminal of the first piezoelectric element; and i. a second hydrophone system output terminal electrically coupled to the positive output terminal of the third piezoelectric element.

17. The hydrophone system of claim 16 wherein the first capacitor is a variable capacitor.

18. The hydrophone system of claim 16 wherein the second capacitor is a variable capacitor.

\* \* \* \* \*

UNITED STATES PATENT AND TRADEMARK OFFICE
CERTIFICATE OF CORRECTION

PATENT NO. : 5,541,894
DATED : July 30, 1996
INVENTOR(S) : Louis W. Erath

It is certified that error appears in the above-indentified patent and that said Letters Patent is hereby corrected as shown below:

Column 5, line 51, delete the word "divide" and insert therefor the word --"divider"--.

Signed and Sealed this

Seventh Day of January, 1997

Attest:

BRUCE LEHMAN

Attesting Officer          Commissioner of Patents and Trademarks